United States Patent [19]
Beelitz

[11] Patent Number: 5,944,820
[45] Date of Patent: Aug. 31, 1999

[54] MODIFIABLE PARTITION BOOT RECORD FOR A COMPUTER MEMORY DEVICE

[75] Inventor: Alan E. Beelitz, Austin, Tex.

[73] Assignee: Dell U.S.A., L.P., Round Rock, Tex.

[21] Appl. No.: 08/951,135

[22] Filed: Oct. 15, 1997

[51] Int. Cl.[6] .................................................. G06F 9/445
[52] U.S. Cl. .................................. 713/1; 713/2; 713/100
[58] Field of Search ................................... 395/651, 550, 395/551; 364/8; 713/1, 2, 100

[56] References Cited

U.S. PATENT DOCUMENTS

| | | | |
|---|---|---|---|
| 5,214,695 | 5/1993 | Arnold et al. | |
| 5,237,460 | 8/1993 | Miller et al. | 360/8 |
| 5,289,540 | 2/1994 | Jones | 380/4 |
| 5,657,473 | 8/1997 | Killean et al. | 714/23 |
| 5,664,195 | 9/1997 | Chatterji | 395/712 |
| 5,727,213 | 3/1998 | Vander Kamp et al. | 395/681 |
| 5,812,767 | 9/1998 | Desai et al. | 709/250 |
| 5,822,614 | 10/1998 | Kenton et al. | 710/8 |

Primary Examiner—Dennis M. Butler
Assistant Examiner—Abu Hossain
Attorney, Agent, or Firm—Haynes and Boone, L.L.P.

[57] ABSTRACT

A system and method for providing a modifiable partition boot record for a memory device of a computer. The computer includes a processor for loading and running boot code and operating code. The memory device, which can be accessed by the processor, includes at least two partitions, the first partition initially being active and having a type that is not recognized by the operating system code and the second partition initially being inactive. When the computer boots up, the processor first accesses the active partition. Once the active partition has been accessed, the processor then converts the type for the active partition to a visible type, i.e, a type that is recognizable to the operating system code. When the operating system code is loaded, it recognizes the type for the active partition and therefore does not encounter an error. Once the operating system code has been loaded, the processor converts the type for the active partition back to a non-visible type. Because the operating system is now loaded, the processor can perform other tasks. For example, the processor can perform an EBTS program that prompts a user for acceptance of a software license, the software being stored in the second partition. If the user accepts the software license, the processor then designates the second partition as active.

21 Claims, 1 Drawing Sheet

5,944,820

MODIFIABLE PARTITION BOOT RECORD FOR A COMPUTER MEMORY DEVICE

BACKGROUND

The present disclosure relates generally to computers and more specifically to a partition boot record for a computer memory device that can change types dynamically, such as from a non-recognizable boot record to a recognizable boot record.

In a computer having one or more storage devices such as a hard disk drive, the storage devices are often separated into different partitions so that certain data or programs can be stored on separate partitions. For example, in a computer that utilizes a Microsoft DOS, Windows, or Windows 95 operating system, as provided by Microsoft Corporation of Redmond, Wash., a single computer hard drive may be partitioned into one partition which would contain the operating system code and another partition which would contain utility or maintenance type programs. For the remaining discussion, only DOS will be described for the sake of brevity and clarity, it being understood that DOS is representative of the above described operating systems as well as many other operating systems.

One example of such a utility or maintenance type program is an electronic break-the-seal ("EBTS") program. An EBTS program is often used to enforce a software license agreement for another program. To implement the EBTS program, a first partition is created as a utility partition and contains the EBTS program. A second partition is created as a primary partition and contains the program subject to the software license. Initially, the utility partition is marked as "active" so that the computer access the utility partition first. Upon acceptance of the license agreement, the primary partition is then marked as active so that the computer will subsequently access the primary partition first.

However, the above scenario has several problems associated therewith. For one, it may not be desirable to allow the user to access the utility partition during his normal operation of the computer. This may be because the user can access various maintenance and utility programs that are too powerful and would allow the user to easily lose the data on his hard drive, reconfigure the computer, or other scenarios best kept from the user. Therefore, a solution is to make the utility partition not normally visible by the operating system. This is accomplished by setting a "partition type code" for the utility partition to a value that is not recognizable by the operating system. The configuration and manipulation of storage devices such as a hard drive are described in the book THE HARD DISK SURVIVAL GUIDE by Mark Minasi, SYBEX, Inc., 1991, which is hereby incorporated by reference.

However, this introduces another problem. In the present example, the utility partition is initially marked as active so that when the computer boots, it looks only to the utility partition. While in the utility partition, the computer may want to run a maintenance or utility program such as the EBTS program. However, before the EBTS program can be run, the computer must first load operating system code from within the active partition. In the present example, the computer would load at least two DOS system files: IO.SYS and MSDOS.SYS. The IO.SYS system file checks the partition type code of the active partition to ensure that the partition type is one that it recognizes. Since this is not the case, the IO.SYS encounters an error and issues an error message, accordingly. As a result, the EBTS program can not be performed.

SUMMARY

In response thereto, provided is a system and method for providing a modifiable partition boot record for a memory device of a computer. In one embodiment, the computer includes a processor for loading and running boot code and operating system code. The memory device, which can be accessed by the processor, includes at least two partitions, the first partition initially being active and having a type that is not recognized by the operating system and the second partition initially being inactive.

When the computer boots up, the processor accesses the active partition, which is initially the first partition. Once the active partition has been accessed, software in the active partition directs the processor to convert the type for the active partition to a visible type, i.e, a type that is recognizable to the operating system. Therefore, when the operating system is loaded, it recognizes the type for the active partition and does not encounter an error. Once the operating system has been loaded, additional software directs the processor to convert the type for the active partition back to a non-visible type.

Because the operating system is now loaded, the processor can perform other tasks. For example, the processor can perform an EBTS program that prompts a user for acceptance of a software license, the software being stored in the second partition. If the user accepts the software license, the processor then designates the second partition as active.

A technical advantage achieved is that after the second partition is designated as active, the first partition is no longer easily accessible by a typical user.

Another technical advantage achieved is that programs such as an EBTS program can be performed and completed before the user ever encounters the second partition, thereby leaving the "user experience" with the programs of the second partition uninterrupted.

DETAILED DESCRIPTION OF THE PREFERRED EMBODIMENT

Figure 1:
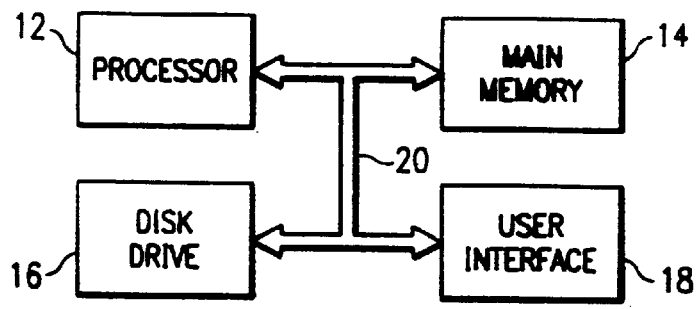
FIG. 1 is a block diagram of a computer for implementing one embodiment.

Referring to FIG. 1, the reference numeral 10 designates a computer having several components, including at least one processor 12, a main memory 14, a disk drive 16, and a user interface 18 such as a keyboard or mouse. Each component is capable of communication with the processor 12, as graphically represented by a general bus 20. In the present example, the computer is a personal computer for running Microsoft DOS. It is understood, however, that the computer 10 and its illustrated components are merely representative of many different types of computers well known and understood in the art and DOS is merely representative of many different operating systems.

Figure 2:
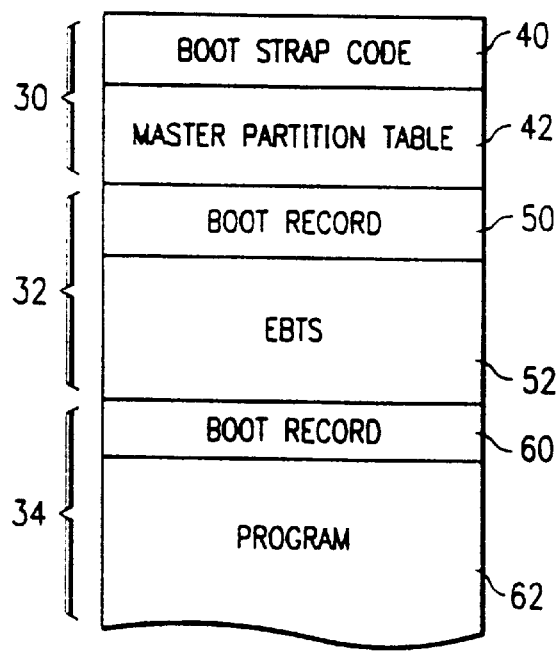
FIG. 2 is a layout diagram of a hard drive of the computer of FIG. 1.

Referring to FIG. 2, the disk drive 16 is subdivided into three different partitions: a master boot record 30, a utility partition 32, and a primary partition 34. Located in the master boot record 30 is boot strap code 40 and a master partition table 42. The master partition table includes codes that represent a type for each partition 32 and 34. It is understood that the master boot record 30 contains conventional code for booting up the computer 10 and defining the other partitions of the hard disk 16.

The utility partition 32 includes a boot record 50 and one or more pieces of software including an EBTS program 52 containing a license agreement. In normal operation, the utility partition 32 will only be used during special circumstances, such as the first time the computer is run by a user. The primary partition 34 also contains a boot record 60 and one or more pieces of software, such as a program 62 which is subject to the license agreement of the EBTS program 52. In normal operation, the primary partition 34 will be readily accessible by the user. It is an object of the present embodiment to require that a user accept the terms of the license agreement of the EBTS program 52 before being allowed access to the program 62.

Figure 3:
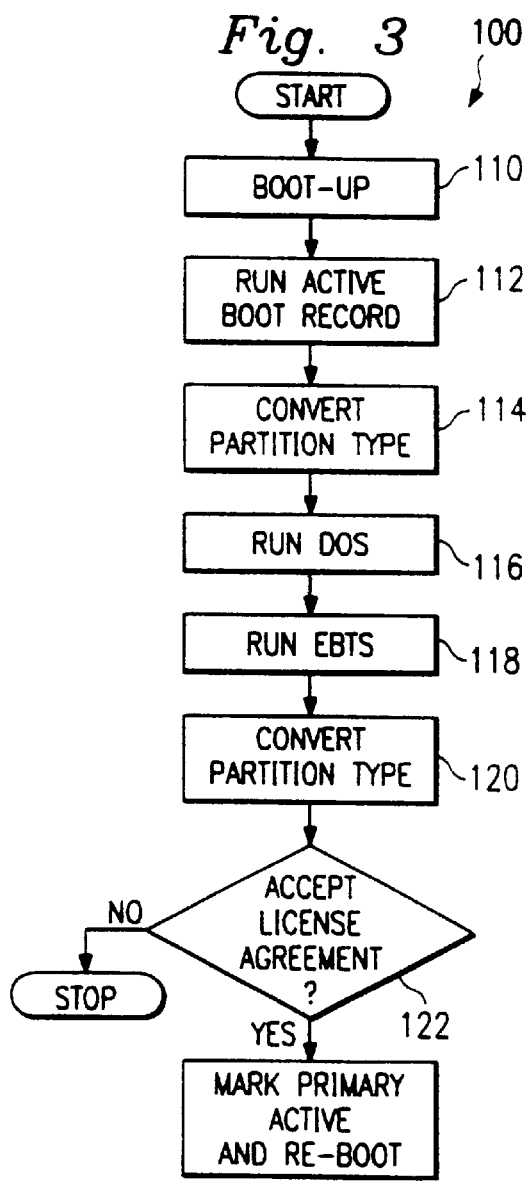
FIG. 3 is a flow chart of a routine to be run by the computer of FIG. 1.

Referring to FIG. 3, a routine 100 is used to provide access to the program 62 upon user acceptance of the license agreement of the EBTS program 52. When the computer 10 is shipped from the factory, the utility partition 32 is initially marked active (and therefore the primary partition 34 is inactive). Additionally, the partition type for the utility partition 32 is set to DEh (hex) and the partition type for the primary partition 34 is set to 06h. In the preferred embodiment, the type 06 is a valid partition type code but type DE is not and is therefore un-recognizable by DOS.

At step 110, the processor 12 boots up by performing the boot strap code 40. At step 112, the processor 12 runs the boot record for the active partition, which is presently the boot record 50 of the utility partition 32. At step 114, the boot record 50 changes its partition type to 06h (i.e., a valid type) and correctly writes out the master partition table 42. At step 116, IO.SYS (part of the DOS operating system code) is loaded. When IO.SYS loads, it "sees" the partition type 06h, and then proceeds to perform an operating system startup process. At step 118, once the operating system startup process has completed, the EBTS program 52 is run. At step 120, the EBTS program 52 changes its partition type to DEh (i.e., an invalid type) and correctly writes out the master partition table 42. At step 122, the EBTS program 52 prompts the user on the user interface 18 as to whether he accepts the license agreement.

If the user indicates acceptance, such as selecting an "ACCEPT" option on the user interface 18, execution proceeds to step 124. At step 124, the primary partition 34 is marked as active (and therefore the utility partition 32 is inactive) and the computer 10 reboots. If, however, the user does not indicate acceptance, execution proceeds to step 126. At step 126, the user is notified that he may not access the program 62 and the routine 100 is stopped. Alternatively, the user may be re-prompted or provided with additional information about the license agreement.

As a result, when the computer 10 reboots, it now is able to access the primary partition 34 and run the program 62. Furthermore, if an operating system such as Microsoft Windows is loaded on the primary partition 34, because the EBTS program 52 has already completed, the user's "Windows experience" is uninterrupted by the EBTS program. Further still, the utility partition 32 may contain additional programs, such as maintenance and diagnostic programs that should not be readily available to the user. However, a technician can re-activate the utility partition and thereby access the maintenance and diagnostic programs.

Although illustrative embodiments of the present invention have been shown and described, a latitude of modification, change and substitution is intended in the foregoing disclosure, and in certain instances, some features of the invention will be employed without a corresponding use of other features. For example, the hard disk 16 may instead be a tape drive, an optical storage device, or other type of memory storage. Furthermore, additional buffers, drivers, delay circuits and other circuits may be added to the illustrative embodiment without altering the scope of the invention. Accordingly, it is appropriate that the appended claims be construed broadly and in a manner consistent with the scope of the invention.

What is claimed is:

1. A computer comprising:

at least one processor for loading and running boot code and operating code;

at least one storage device accessible by the processor, the storage device being separated into at least two partitions, the first partition initially being designated as active and having a type that is not recognized by the operating code; and wherein, when the processor is running the boot code and the first partition is active, the processor runs a type changing routine; and wherein the type changing routine instructs the processor to convert the type of the first partition to a type that is recognizable by the operating code so that when the operating code is run, the operating code recognizes the first partition.

2. The computer of claim 1 wherein the type changing routine is stored in the first partition on the storage device.

3. The computer of claim 1 wherein the operating code is stored in the first partition on the storage device.

4. The computer of claim 1 wherein, after the operating code has recognized the first partition, the type-changing routine instructs the processor to convert the type of the first partition to a type that is not recognizable by the operating code.

5. The computer of claim 4 further comprising a program stored in the first partition on the storage device; and wherein if a user interacts with the program in a predetermined manner, the type changing routine will designate the second partition as active.

6. The computer of claim 5 wherein the program is an electronic break-the-seal program for licensing software located in the second partition.

7. The computer of claim 5 further comprising a user interface connected to the processor and wherein the user interaction is received through the user interface.

8. The computer of claim 1 wherein the storage device also includes a master partition table for storing the type of the first partition.

9. The computer of claim 4 further comprising a program stored in the second partition on the storage device; and wherein if a user interacts with the type-changing routine in a predetermined manner, the type-changing routine will instruct the second partition to be designated as active so that the user may access the program.

10. The computer of claim 9 wherein if the user does not interact with the type-changing routine in the predetermined manner, the type-changing routine will not instruct the second partition to be designated as active so that the user may not access the program.

11. In a computer having a processor for running an operating system and storage accessible by the processor, a method for controlling access to software on the storage, the method comprising:

(a) before the computer is booted-up:

(i) separating the storage into at least two partitions, wherein the first partition is active;
(ii) storing the software in the second partition;
(iii) designating the first partition as a non-visible type; and (b) when the computer is booted-up:
(i) accessing by the processor the active partition;
(ii) re-designating the active partition as a visible type;
(iii) loading the operating system;
(iv) converting the active partition back to the non-visible type;
(v) determining if the software may be accessed;
(vi) if the software may be accessed, designating the second partition as active.

12. The method of claim 11 wherein step (b)(v) is performed by prompting a user to accept a software license and determining whether the user responded to the prompt in a predetermined manner.

13. The method of claim 11 wherein the storage device includes a master partition table for storing the type of the first partition.

14. The method of claim 11 wherein the storage device includes boot code for booting the computer.

15. The method of claim 11 wherein step (a) further comprises:
(iv) storing at least part of the operating system in the first partition.

16. The method of claim 11 wherein step (a) further comprises:
(iv) storing at least part of the operating system in the second partition.

17. In a computer having a processor for running an operating system and a storage device that is accessible by the processor and separated into at least two partitions, the first partition being active and having a non-recognizable type and the second partition containing a piece of software, a system for allowing a user to have controlled access to the piece of software, the system comprising:

means for enabling the processor to access the active partition;

means for converting the type of the active partition to one that is recognizable by the operating system before the processor loads the operating system;

means for loading the operating system;

means for converting the type for the active partition back to a non-recognizable type after the operating system has been loaded;

means for determining if the user may access the piece of software;

means for designating the second partition as active in response to a determination that the user may access the piece of software.

18. The system of claim 17 wherein the means for determining prompts the user to accept a software license and determines whether the user responded to the prompt in a predetermined manner.

19. The system of claim 17 wherein the storage device includes a master partition table for storing the type of the first partition.

20. The system of claim 17 wherein at least part of the operating system is stored in the first partition.

21. The system of claim 17 wherein at least part of the operating system is stored in the second partition.

* * * * *